(12) United States Patent
Nishikawara et al.

(10) Patent No.: US 9,341,468 B2
(45) Date of Patent: May 17, 2016

(54) MEASURING APPARATUS

(71) Applicant: CANON KABUSHIKI KAISHA, Tokyo (JP)

(72) Inventors: Tomofumi Nishikawara, Utsunomiya (JP); Takahiro Yamamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/343,606

(22) PCT Filed: Nov. 3, 2013

(86) PCT No.: PCT/JP2013/001569
§ 371 (c)(1),
(2) Date: Mar. 7, 2014

(87) PCT Pub. No.: WO2013/136760
PCT Pub. Date: Sep. 19, 2013

(65) Prior Publication Data
US 2014/0211214 A1    Jul. 31, 2014

(30) Foreign Application Priority Data

Feb. 15, 2012 (JP) ................................. 2013-027967
Mar. 12, 2013 (JP) ................................. 2012-054713

(51) Int. Cl.
*G01B 11/24* (2006.01)
*G01B 5/00* (2006.01)

(52) U.S. Cl.
CPC .............. *G01B 11/24* (2013.01); *G01B 5/0011* (2013.01)

(58) Field of Classification Search
CPC ...... G01B 11/24; G01B 5/0011; G01B 5/213; G01K 7/42; G01F 7/70875

USPC ........................ 356/601–623; 374/102, 141
See application file for complete search history.

(56) References Cited

U.S. PATENT DOCUMENTS 4,052,854 A * 10/1977 du Pre ..................... F02G 1/055
165/104.14
5,231,291 A * 7/1993 Amemiya et al. ......... 250/443.1
(Continued)

FOREIGN PATENT DOCUMENTS

JP    10-170220 A    6/1998
JP    10-293066 A    11/1998
(Continued)

OTHER PUBLICATIONS

International Search Report issued in PCT/JP2013/001569 dated May 21, 2013.

*Primary Examiner* — Hoa Pham
(74) *Attorney, Agent, or Firm* — Rossi, Kimms & McDowell LLP (57) ABSTRACT

A measuring apparatus includes a light projecting and receiving device configured to project and receive light, and measures an object based on the projected and received light. The measuring apparatus comprises a chamber configured to enclose a first space for accommodating the object; a partition configured to separate the first space from a second space which accommodates the light projecting and receiving device, and configured to transmit the light; a first regulator configured to regulate temperature of the first space to a first temperature by flowing a gas through the first space; and a second regulator configured to regulate temperature of the second space to a second temperature different from the first temperature by flowing a gas through the second space. The partition includes a plurality of partition walls disposed with a gap.

19 Claims, 7 Drawing Sheets

(56) References Cited

U.S. PATENT DOCUMENTS

| | | | | |
|---|---|---|---|---|
| 6,813,032 | B1* | 11/2004 | Hunter | 356/601 |
| 6,949,202 | B1* | 9/2005 | Patel | B81C 1/00587 156/345.29 |
| 2006/0034344 | A1* | 2/2006 | Hirano et al. | 374/137 |
| 2006/0054278 | A1* | 3/2006 | Makino et al. | 156/345.27 |
| 2008/0078744 | A1* | 4/2008 | Wang | H01J 37/00 216/67 |
| 2008/0318345 | A1* | 12/2008 | Persing et al. | 438/7 |
| 2009/0159814 | A1* | 6/2009 | Maiya | G02B 21/16 250/458.1 |

FOREIGN PATENT DOCUMENTS

| | | |
|---|---|---|
| JP | 2001-257461 A | 9/2001 |
| JP | 3897655 B2 | 3/2007 |
| JP | 2008-223261 A | 9/2008 |
| JP | 2008-261679 A | 10/2008 |

* cited by examiner

MEASURING APPARATUS

TECHNICAL FIELD

The present invention relates to a measuring apparatus that is configured to measure an object.

BACKGROUND ART

An apparatus that is configured to determine (measure) a surface shape of an optical element such as a lens or a mirror or the like includes for example a non-contact shape-measuring apparatus. In the step of manufacturing the optical element, the shape of the optical element is configured with reference to target shape dimensions by repetition of shape determination of the optical element by a shape measuring apparatus, and by corrective grinding. However, it may be the case that the temperature in the use environment when the optical element is used by assembly into an optical apparatus exhibits a large difference from the temperature (for example, normal temperature (room temperature) of approximately 23 degrees C.) for a general determination environment (for example, the manufacture environment of the optical element). Consequently, when the temperature of the use environment and the temperature of the determination environment differ, the shape of the optical element in the use environment deforms from the shape during determination. Therefore, determination of a surface shape of the optical element in the manufacture stage of the optical element should be preferably performed at the temperature of the environment in which the optical element is used. In this regard, it has been proposed to place the overall shape measuring apparatus at the same temperature as the temperature of the use environment to thereby determine the surface shape. However, when the shape measuring apparatus is used under a condition(s) that differs from the setting specification (the setting specification assumes determination for example at ambient temperature), a shape error occurs due to thermal deformation (thermal distortion) in the determination apparatus itself, and high-accuracy determination becomes difficult. On the other hand, Patent Literature 1 discloses a linear expansion coefficient determination apparatus configured to accommodate an object in an insulated container and thereby perform a high accuracy determination of the dimensional variable amount relative to temperature change in the object.

CITATION LIST

Patent Literature

[Patent Literature 1] Japanese Patent No. 3897655

However, an astronomical telescope used in the field of astronomy is often used at a high position such as a mountain peak with an altitude of several thousand meters, and as a result the temperature of the use environment is low. In this respect, although a configuration has been proposed to control the overall shape determination apparatus or the object to the low temperature of the use environment, an optical element in a determination apparatus such as a reference minor or the like that forms the determination standard for an interferometer is subject to dew condensation at a low temperature environment (for example, 10 degrees C. or less). Such dew condensation causes an impediment to high accuracy determination.

SUMMARY OF INVENTION

The present invention provides a measuring apparatus that is advantageous for measurement of an object in an environment temperature of which is different from normal temperature.

According to an aspect of the present invention, a measuring apparatus includes a light projecting and receiving device configured to project and receive light, and measures an object based on the projected and received light. The measuring apparatus comprises a chamber configured to enclose a first space for accommodating the object; a partition configured to separate the first space from a second space which accommodates the light projecting and receiving device, and configured to transmit the light; a first regulator configured to regulate temperature of the first space to a first temperature by flowing a gas through the first space; and a second regulator configured to regulate temperature of the second space to a second temperature different from the first temperature by flowing a gas through the second space. The partition includes a plurality of partition walls disposed with a gap.

According to the present invention, a measuring apparatus can be provided that is advantageous for measurement of an object in an environment temperature of which is different from normal temperature.

Further features of the present invention will become apparent from the following description of exemplary embodiments with reference to the attached drawings.

DESCRIPTION OF EMBODIMENTS

Hereinafter, preferred embodiments of the present invention will be described with reference to the drawings.

(First Embodiment)

Figure 1:
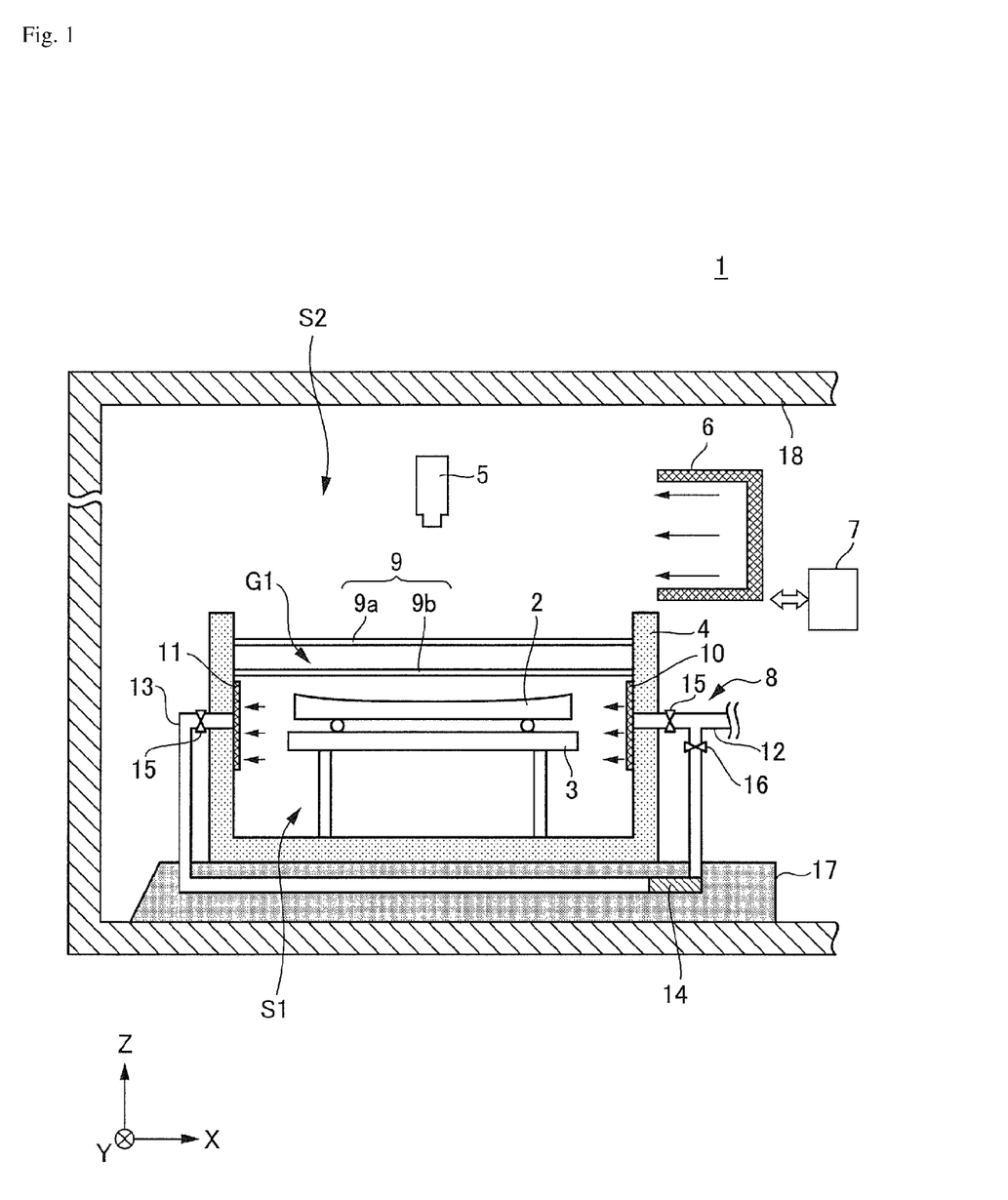
FIG. 1 illustrates a configuration of a shape measuring apparatus according to a first embodiment of the present invention.

Firstly, a shape measuring apparatus (measuring apparatus) according to a first embodiment of the present invention will be described. FIG. 1 is a schematic view of a configuration of a shape measuring apparatus according to a first embodiment. The shape measuring apparatus 1 is configured as a non-contact determination apparatus in which an optical element such as a lens, minor or the like as used in an astronomical telescope is configured as the object (determined object), and that determines the surface shape of that object. In the figures below, an X axis and a Y axis are configured to be orthogonal to a plane in which the object is disposed on a holding unit, and a Z axis is perpendicular (vertical direction in the present embodiment) to the XY plane. The shape measuring apparatus 1 includes a holding unit 3 configured to dispose and fix an object 2, a chamber 4 that installs the holding unit 3 in an inner portion thereof, a determining device 5 (light projecting and receiving device) configured to determine the surface shape of the object 2 in a non-contact state, a duct 6 that blows air into a space that contains the determining device 5, and a control unit 7. In particular, the shape measuring apparatus 1 enables respectively independent temperature control of a first space S1 in which the object 2 is disposed and a second space S2 that includes the determining device 5 so that the temperature (hereinafter referred to as 'actual environment temperature') is constant in the environment in which the object 2 is actually used. The actual environment temperature is described below assuming that it is less than ambient temperature (in the following example, 2 degrees C.). In this regard, when the actual environment temperature is higher than ambient temperature, the temperature of the supplied air, or the supply direction of air that has an adjusted temperature is inverted when compared with the following example.

The holding unit 3 exhibits a detachable fixing function in relation to the object 2. The chamber 4 is an accommodating portion for the object 2, and includes an insulating structure configured to insulate heat from the outside, and in addition enables variation of the temperature of the internal space (in the first space). The chamber 4 includes a first adjusting mechanism 8 configured to adjust the temperature in the first space S1, and in particular includes a partition 9 that separates the first space S1 from the space in which the determining device 5 is installed (second space) S2. The first adjusting mechanism 8 includes a supply unit (supply port) 10 that is configured to supply a gas (hereinafter referred to as 'temperature adjusted air', also referred to as "temperature regulated air") that is adjusted to a certain temperature (in this case, a first temperature) into the first space S1. Furthermore, the first adjusting mechanism 8 includes a discharge unit (exhaust port) 11 that is disposed in a position facing the support unit 10 in the first space S1 and is configured to recover and discharge (exhaust) temperature adjusted air supplied from the supply unit 10. In other words, the first adjusting mechanism 8 enables flow of temperature adjusted air in the first space S1. During this period, the supply unit 10 includes a flow speed control device (not shown) that is connected to a temperature adjusting device (not shown) through a supply pipe 12, and is configured to control the flow speed of temperature adjusted air so that the temperature distribution of the object 2 in the first space S1 is reduced. The temperature adjusting device adjusts the first temperature for example to 2 degrees C. The flow speed control device adjusts the flow speed of temperature adjusted air to approximately 2 (m/s). On the other hand, the discharge unit 11 is connected to a discharge pipe 13 to thereby suppress the occurrence of air stagnation by effective creation of air flow in the first space S1 by recovering temperature adjusted air that has flowed through the first space S1. In this context, the temperature of the temperature adjusted air that is recovered in the discharge pipe 13 is warmed by the effect of the peripheral temperature, and therefore is higher than the first temperature. Therefore, the discharge pipe 13 preferably has a structure in which it is connected to the supply pipe 12 on an outer portion of the chamber 4 and recycles cooled air by installation of a cooling unit 14 along the piping between the supply pipe 12 and the discharge pipe 13. This type of structure of piping to recycle cool air has the advantage of enhancing the cooling efficiency in comparison to cooling the temperature adjusted air for example of the external air temperature of 23 degrees C. to 2 degrees C. When a structure of recycling cool air in this manner is not possible, the first space S1 may be temperature adjusted to the actual environment temperature by providing the supply pipe 12 and the discharge pipe 13 in an independent configuration. Furthermore, the supply pipe 12 and the discharge pipe 13 are respectively provided with a first valve 15, and in addition, the discharge pipe 13 also includes provision of a second valve 16 at two positions both upstream and downstream of the cooling unit 14 (reference is made to FIGS. 2A and 2B). The first valve 15 and the second valve 16 are mainly used when switching the object 2. At this time, the respective first valves 15 are closed, and the second valves 16 are opened to thereby temporarily stop supply of temperature adjusted air into the first space S1 and thereby enable the switching operation. The partition 9 is a plate member that separates the first space S1 and the second space S2, and is configured from a material that allows transmission so that laser light from the determining device 5 in the second space S2 becomes suitably incident on the object 2 that is disposed in the first space S1. For example, when the determining device 5 uses a He—Ne laser than employs measuring light with a measuring wavelength of 633 (nm), the material of the partition 9 is configured from quartz glass that allows transmission of the He—Ne laser. In particular, in the present embodiment, the partition 9 as shown in FIG. 1 includes a first partition wall 9a and a second partition wall 9b that is disposed with a fixed gap G1 from the first partition wall 9a. The operation of the partition 9 will be described hereafter.

Figure 2A:
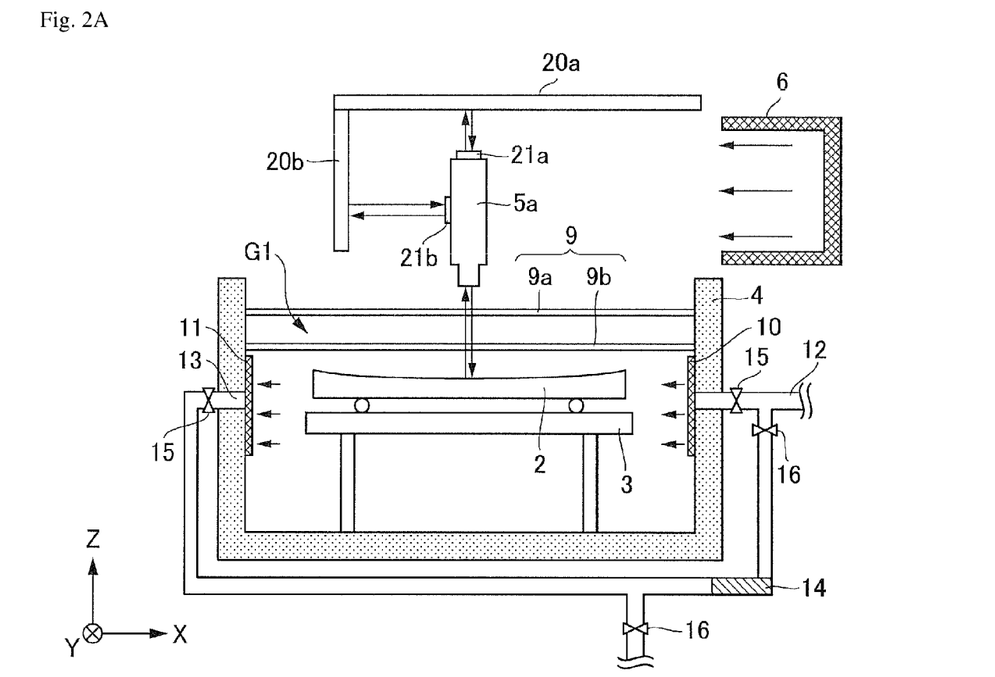
FIG. 2A describes a determining device that can be adapted to a shape measuring apparatus 1.
Figure 2B:
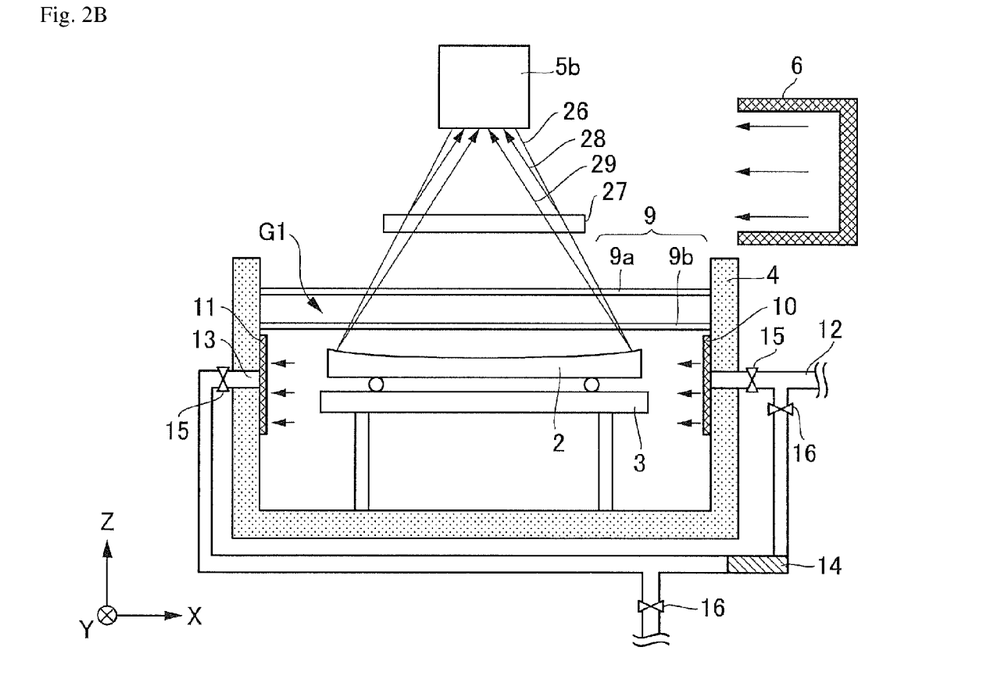
FIG. 2B describes a determining device that can be adapted to a shape measuring apparatus 1.

The determining device 5 is an optical determining device (light receiving/emitting device) that determines the surface shape of the object 2 in a non-contact state. FIG. 2A and 2B are schematic views including a configuration of a shape measuring apparatus 1 that includes an actual determining device 5 corresponding to the configuration shown in FIG. 1. In FIG. 2A, the determining device 5 can move in the XY plane, and adopts a probe 5a configured to detect the change (change in a position in the Z axis direction) in the position of the surface of the object 2 through a change in the optical path length of the measuring light for example by emitting and receiving light (measuring light) relative to the surface of the object 2. When the probe 5a is adopted, a plurality of position-determining reference mirrors 20 (20a, 20b) is installed in a region on the upper portion and the side portion of the probe 5a, and a plurality of laser measuring devices 21 is disposed facing the reference mirrors 20. The position determination of the probe 5a is controlled based on an output to the laser measuring device 21. Firstly, the position determination in the Z axis direction (optical axis direction of the measuring light) is executed based on an output of the Z-axis laser measuring device 21a. On the other hand, the position determination in the X axis direction is executed based on an output of the X-axis laser measuring device 21b. Furthermore, although the position determination in the Y axis direction is not shown in the same manner as the positional determination in the X axis direction, it is executed based on an output of the Y-axis laser measuring device 21. During this positional determination, the control unit 7 as described below acquires an output signal from the respective X-axis, Y-axis and Z-axis laser measuring devices 21, and on that basis, sends a control signal to the drive system (not shown) that displaces the probe 5a. The drive system positions the probe 5a with high accuracy with respect to the object 2 through an arm (not shown) that is connected to the probe 5a. The direction of principal motion of the probe 5a (main scan) is preferably a direction that is orthogonal (intersects) to both the direction of extension of the optical path of the measuring light and the supply direction of the temperature adjusted air supplied from the duct 6 (described below). This is due to the possibility of disruption to the flow of temperature adjusted air when the displacement direction of the probe 5a is opposed to the direction of supply of the temperature adjusted air. Therefore, for example, as shown in FIG. 2A, if the supply direction of temperature adjusted air is configured as the X axis direction, and the direction of the optical path of the measuring light is configured as the Z axis direction, the direction of continuous motion of the probe 5a through a longer period of time (main scan) may be configured as the Y axis direction. On the other hand, the direction of stepwise motion of the probe 5a through a shorter period of time (subscanning direction) may be configured as the X axis direction.

On the other hand, in FIG. 2B, an interferometer 5b configured to determine the surface shape of the object 2 is adopted as the determining device 5. The interferometer 5b firstly irradiates laser light 26 towards the object 2 from the illumination optical system (not shown) that is included in an inner portion. At this time, a portion of the laser light 26 is reflected by the reference mirror 27 that is disposed in the interval with the object 2 (chamber 4), and a first reflected light 28 (reference light) resulting from that reflection returns to the interferometer 5b. In this regard, the emitted laser light 26 that passes through the reference minor 27 is reflected by the detected surface of the object 2, and a second reflected light 29 (measuring light) resulting from that reflection returns to the interferometer 5b. The shape of the reference minor 27 is processed to thereby obtain the determining accuracy required for the shape determination of the object 2, and the wave front of the first reflected light 28 from the reference mirror 27 is the reference wave front for determination. The interferometer 5b enables detection of the interference band of the first reflected light 28 and the second reflected light 29. The surface shape of the object 2 is measured based on the interference band. Although the reference mirror 27 is disposed in the example as shown in FIG. 2B in the second space S2, the mirror 27 may be disposed on the first space S1.

The duct 6 is a second adjusting mechanism configured to adjust the temperature in the second space S2 by flowing a temperature adjusted air to the second space S2 that includes the determining device 5 (and the laser measuring device 21). The temperature adjusted air is adjusted to the second temperature by the temperature adjusting device (not shown) to thereby ensure the positioning accuracy by the laser measuring device 21. The temperature and the flow rate of the temperature adjusted air supplied from the duct 6 are controlled to avoid a measurement error caused by a deviation (fluctuation in the refractive index) of the air in the optical path of the measuring light from the laser measuring device 21 that performs positioning. In this configuration, the temperature adjusting device adjusts the second temperature to for example 23 degrees C. Furthermore, the duct 6 adjusts the flow rate of the temperature adjusted air to approximately 0.5 (m/s). The temperature adjusted air supplied from the duct 6 is discharged from the discharge port (not shown). The control unit 7 controls the operation of the measuring device 5 and the operation and adjustment of the first adjusting mechanism 8 and the duct 6, in addition to processing the determining result obtained from the determining device 5.

The shape measuring apparatus 1 further includes a surface plate 17 that allows mounting of the chamber 4 and a pedestal 18 that is configured to support the respective constituent elements of the shape measuring apparatus 1. In particular, when the determining device 5 is configured by the probe 5a as shown in FIG. 2A, the plurality of reference mirrors 20 is disposed respectively on the pedestal 18.

Next, the operation during determining of the surface shape of the object 2 by the shape measuring apparatus 1 will be described. The optical element that represents the object 2 in this configuration may be adopted in relation to various types of optical devices. However, use in a low temperature state is also proposed in response to the use position or the use purpose of the optical device. In particular, an astronomical telescope is used in the field of astronomy is often used at a high position such as a mountain peak at an altitude of several thousand meters, and as a result the temperature of the use environment of the optical element included in the astronomical telescope is low. That is to say, even when the surface shape of the optical element disposed at an ambient environment has been measured, since the surface shape of an optical element disposed at the actual environment temperature that is a low temperature undergoes a change due to thermal deformation, that is to say, a shape error occurs, there are difficulties associated with highly accurate measurement of the surface shape in the desired state. Therefore, as described above, the shape measuring apparatus 1 according to the present embodiment separates the space into the first space S1 in which the object 2 is disposed and the second space that includes the measuring device 5. Furthermore, during shape determination, the control unit 7 executes temperature control so that the first space S1 coincides with the actual environment temperature that is the first temperature and so that the second space S2 coincides with the determining temperature that is the second temperature and thereby ensures determination accuracy.

Since the partitioning unit 9 that configures the chamber 4 is the interface surface of the first space S1 that is controlled to a temperature of 2 degrees C. and the second space S2 that is controlled to a temperature of 23 degrees C., the gap between the temperatures in the Z axis direction in the partition 9 is large. In the present embodiment, radiation of heat from the second space S2 to the first space S1 is suppressed by a configuration of the partition 9 into a plurality of partition walls of the first partition walls 9a and the second partition walls 9b as described above. More specifically, the amount of radiated heat depends on the coefficient of thermal conductivity of the medium material, and therefore thermal radiation from one space to another space may be suppressed by increasing the thermal resistivity through provision of a medium material with a low coefficient of thermal conductivity in the interface layer of the spaces. For example, in substitution for the partition 9 in the present embodiment, it is assumed that a gap is not provided between the first partition wall 9a and the second partition wall 9b, that is to say, a partition is used that is configured by a single transmission plate. The thermal resistivity in this configuration depends on the thickness and the coefficient of thermal conductivity of the partition. When it is assumed that the material of the partition is configured from quartz glass that enables transmission of measuring light, the coefficient of thermal expansion at 20 degrees C. is 1.38 (W/(m*K))(hr). In this regard, when the gap G1 between the first partition wall 9a and the second partition wall 9b is configured as an air layer, the coefficient of thermal expansion at 20 degrees C. is 0.02614 (W/(m*K)), and the thermal resistivity at the partition 9 coincides with the thermal resistivity between the two partition walls 9a, 9b and the air. When the surface area of the XY plane of the partition is taken to be 1 (m$^2$) and the thickness direction is 40 (mm), the thermal resistivity R1 in the example of use of a single partition (transmission plate) takes the following value.

$$R1 = (40*10^{-3})/1.38$$
$$= 0.029 \text{ (K/W)}$$

On the other hand, when the thickness of the respective partition walls 9a, 9b is 5 (mm), and the thickness of the air layer is 30 (mm), and the surface area of the XY plane is taken to be 1 (m$^2$) as in the previous example, the thermal resistivity R2 in the air layer in the present embodiment takes the following value.

$$R2 = (5*10^{-3})/1.38 + (30*10^{-3})/0.02614 + (5*10^{-3})/1.38$$
$$= 1.2 \text{ (K/W)}$$

That is to say, the configuration of the partition 9 according to the present embodiment enables an increase of more than one digit in the thermal resistivity when compared to use of a single transmission plate.

In the above manner, the shape measuring apparatus 1 determines the surface shape in a state that is close to the actual use state of the object 2. Therefore, the occurrence of a determination error resulting from a shape error caused by thermal deformation can be suppressed. Furthermore, the shape measuring apparatus 1 maintains the space accommodating the determining device 5 at the recommended determination temperature and ensures the metrology of the determining device 5. Although the above description includes an example in which air is encapsulated in the gap G1, thermal radiation can be further suppressed by encapsulating a gas with a lower coefficient of heat transfer than air, for example, carbon dioxide, in the gap G1. Also, the radiation of heat can also be suppressed by reducing the air pressure in the gap G1 by use of a pressure reduction apparatus. Furthermore, the surface of the respective partition walls 9a, 9b that configure the partition 9 may include an ultraviolet radiation transmission prevention film. Although the ultraviolet radiation transmission prevention film shields light having a wavelength band of several microns, transmission of the wavelength used the determination laser (for example, when using an He-Ne laser, 633 (nm)) is allowed. Therefore, the insulating performance can be enhanced by effective suppression of only thermal radiation resulting from radiation between the first space S1 and the second space S2. In this context, in substitution for the ultraviolet radiation transmission prevention film, the same effect can be obtained by doping an impurity that shields the wavelength band of heat emission into the partition 9.

As described above, according to the present embodiment, a determination apparatus can be provided that is useful for measuring an object under a temperature environment that differs from ambient temperature.

(Second Embodiment)

Figure 3A:
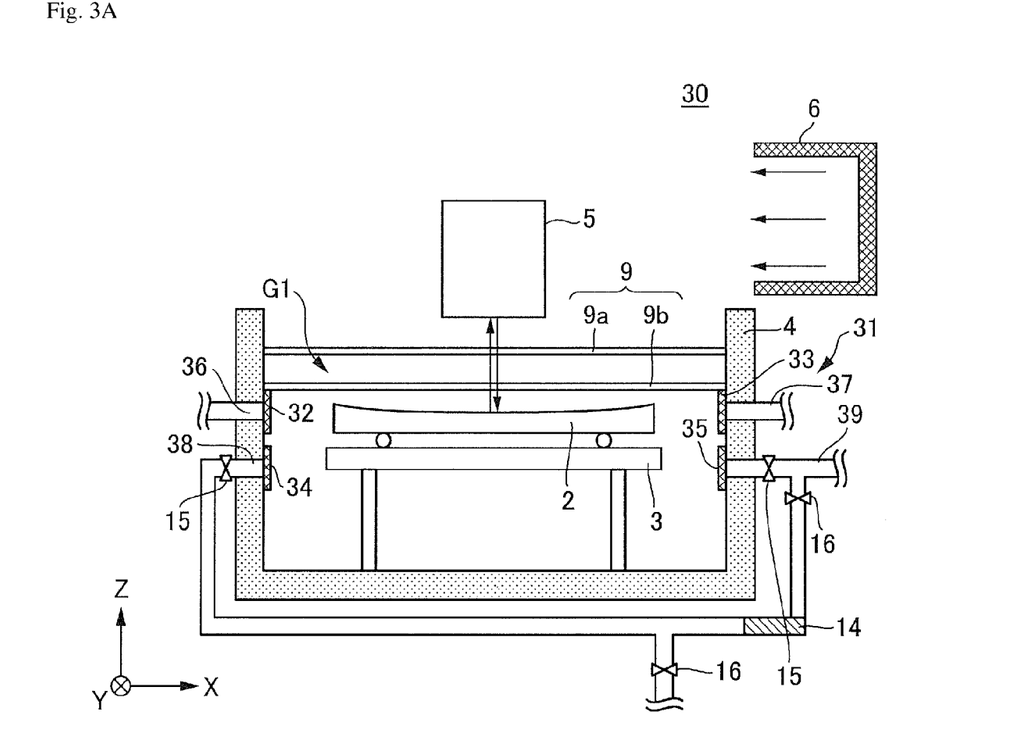
FIG. 3A illustrates a configuration of a shape measuring apparatus according to a second embodiment of the present invention.
Figure 3B:
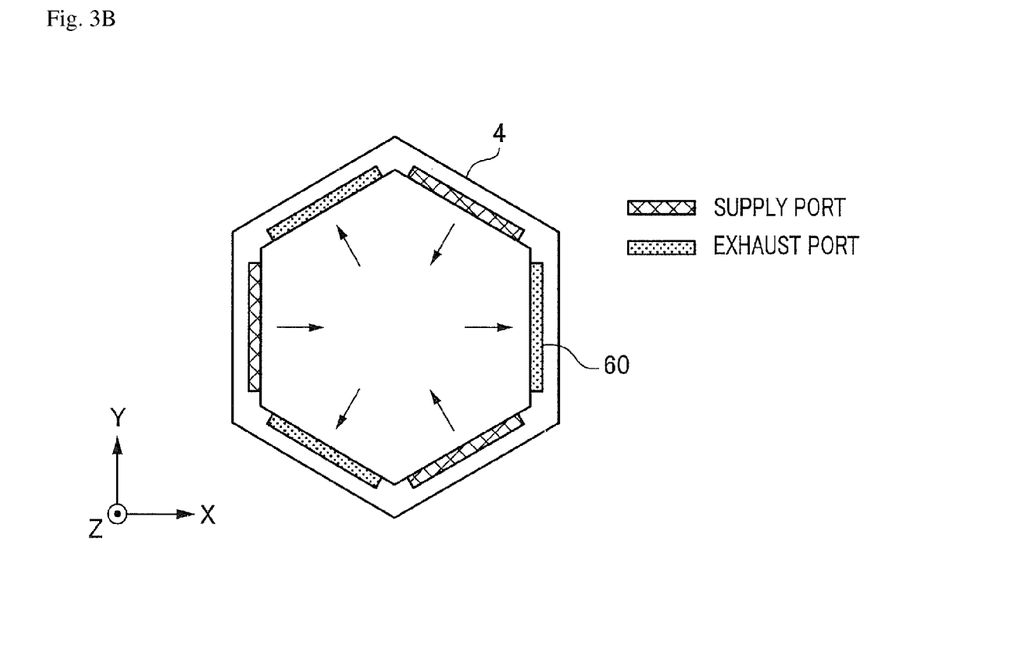
FIG. 3B illustrates a configuration of a shape measuring apparatus according to a second embodiment of the present invention.

Next, a shape measuring apparatus according to a second embodiment of the present invention will be described. FIGS. 3A and 3B are schematic figures illustrating a configuration of the shape measuring apparatus 30 according to the present embodiment. In particular, those constituent elements in FIG. 3A that are the same as the shape measuring apparatus 1 according to the first embodiment shown in FIG. 1 are denoted by the same reference numerals, and description will not be repeated. The characteristic feature of the shape measuring apparatus 30 according to the present embodiment resides in the point that the flow of temperature adjusted air in the first space S1 that accommodates the object 2 is not a single-system single-direction configuration as in the first adjusting mechanism 8 in the first embodiment, but rather a plurality of systems and a plurality of directions. In particular, the first adjusting mechanism 31 according to the present embodiment includes a first air supply/discharge unit 32 and a second air supply/discharge portion 33 to supply and discharge temperature adjusted air to the region on the upper portion that includes the surface of the object 2, and a third air supply/discharge portion 34 and a fourth air supply/discharge portion 35 to supply and discharge temperature adjusted air to the region on the lower portion of the object 2. In other words, the first air supply/discharge unit 32 and the second air supply/discharge portion 33 forms a first system (first group) with either unit on the supply side and the other on the discharge side. In addition, the third air supply/discharge unit 34 and the fourth air supply/discharge portion 35 forms a second system (second group) with either unit on the supply side and the other on the discharge side. The second group is disposed further from the partition 9 than the first group. Also in this case, the first adjusting mechanism 31 enables separate adjustment of the flow rate and the temperature and supply direction of the temperature adjusted air respectively in relation to the first to the fourth air supply/discharge units 32 to 35.

In this case, the control unit 7 sets the first adjusting mechanism 31 so that the direction (supply direction) of flow of the temperature adjusted air flowing through the first system and the direction of flow of the temperature adjusted air flowing through the second system are mutually opposed, that is to say, one is opposed to the other. More specifically, firstly the first adjusting mechanism 31 supplies temperature adjusted air, in relation to which the temperature from the first air supply/discharge unit 32 is adjusted to 2 degrees C., through the first pipe 36 of the first system to the upper portion of the object 2 in the first space S1. Then, the first adjusting mechanism 31 causes the second air supply/discharge unit 33 disposed facing the first air supply/discharge unit 32 to recover the temperature adjusted air so that the recovered temperature adjusted air flows into the second pipe 37. At this time, the temperature of the upper portion of the object 2 approximates the predetermined temperature for temperature control in proximity to the first air supply/discharge unit 32. However, in proximity to the second air supply/discharge unit 33, the temperature adjusted air that is supplied at 2 degrees C. is heated as a result of the effect of the peripheral environment, and therefore has a temperature that is higher than the predetermined temperature. Thus, the first adjusting mechanism 31 supplies temperature adjusted air, in relation to which the temperature from the fourth supply/discharge unit 35 is adjusted to a temperature of 2 degrees C., through the fourth pipe 39 of the second system to the lower portion of the object 2 in the first space S1. Then, the first adjusting mechanism 31 causes the third air supply/discharge unit 34 disposed facing the fourth air supply/discharge unit 35 to recover the temperature adjusted air so that the recovered temperature adjusted air flows into the third pipe 38. In this manner, since the temperature adjusted air that is heated in proximity to the second air supply/discharge unit 33 is cooled, the temperature distribution of the object 2 can be reduced.

Next, a simulation result of the temperature distribution of the object 2 resulting from the configuration of the first adjusting mechanism 31 according to the present embodiment will be described. Firstly, the configuration of the first adjusting mechanism 31 according to the first embodiment results in a maximum temperature in the object 2 of 2.36 degrees C. and a minimum temperature of 2.06 degrees C., and therefore a temperature distribution of approximately 0.3 degrees C. In this regard, the configuration of the first adjusting mechanism 31 according to the present embodiment results in a maximum temperature in the object 2 of 2.27 degrees C. and a minimum temperature of 2.14 degrees C., and therefore a temperature distribution of approximately 0.13 degrees C. In either of these examples, the flow rate of temperature adjusted air to the first space S1 is 5 (m/s) (both upper and lower portions of the object), and the flow rate of temperature adjusted air to the second space S2 is 0.5 (m/s). Furthermore, the thickness of the air layer in the gap G1 is configured to be 80 (mm), and the distance between the second partition wall 9b and the object 2 is configured to be 5 (mm). Furthermore, the simulation results with different settings are described below. The conditions in relation to the first adjusting mechanism 31 of the present embodiment are that the flow rate of the first system, that is to say, of the temperature adjusted air that flows to the upper portion of the object 2 is 2 (m/s), and the flow rate of the second system, that is to say, of the temperature adjusted air that flows to the lower portion of the object 2 is 0.5 (m/s). Furthermore, the thickness of the air layer in the gap G1 is 5 (mm), and the distance between the second partition wall 9b and the object 2 is 20 (mm). In this manner, since the maximum temperature of the object 2 is 2.21 degrees C. and the minimum temperature is 2.12 degrees C., the temperature distribution is approximately 0.09 degrees C. That is to say, the temperature distribution of the object 2 is seen to be reduced by varying the supply direction of the temperature adjusted air in the first system and the second system to be mutually opposite directions. Furthermore, it is effective to vary the distance and the interval of the constituent elements as described above in response to the desired temperature distribution of the object 2. The various types of values described above are merely exemplary, and the invention is not limited thereby. In this manner, the present embodiment has the advantage of a reduction in non-uniformity of the temperature distribution of the object 2 in the measurement environment, and thereby a reduction in the thermal deformation of the measurement device uniqueness applied to the object 2.

Furthermore, the configuration of the plurality of systems of the first adjusting mechanism 31 described above is merely exemplary, and the configuration of the first adjusting mechanism 31 may be varied by the planar shape (outer shape) of the chamber 4, or the thermal deformation suppression amount required by the object 2. For example, when the planar shape of the chamber 4 is polygonal having two or more groups of sides when viewed from the Z axis direction, opposed pairs of sides may be configured so that one is the supply side and the other is the discharge side for temperature adjusted air. If the planar shape of the chamber 4 is hexagonal, the first adjusting mechanism 31 as shown in FIG. 3B includes an air supply/discharge unit 60 on each inner side surface of the chamber 4, and thereby configure a third system that executes either operation of discharge or supply.

(Third Embodiment)

Figure 4:
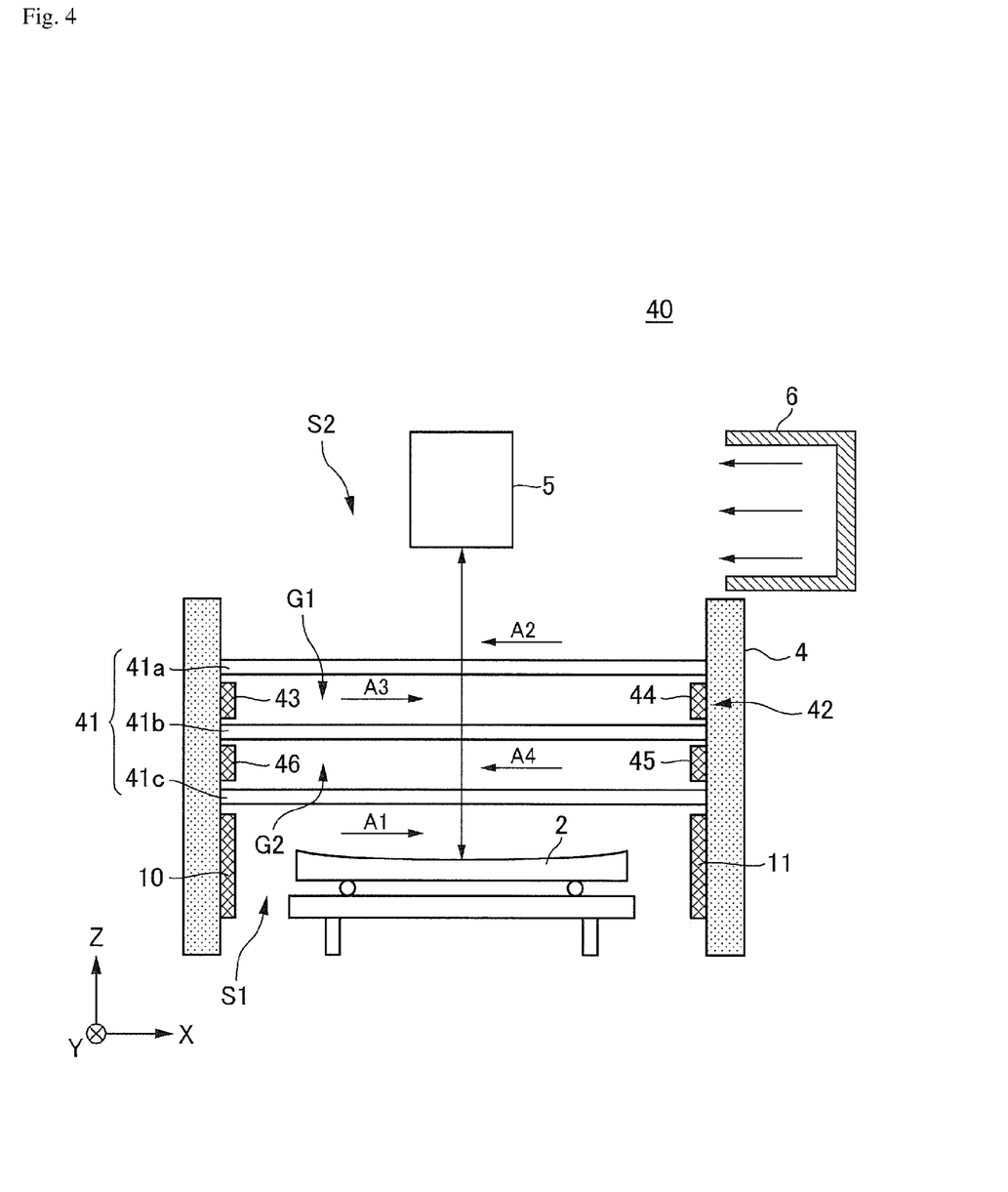
FIG. 4 illustrates a configuration of a shape measuring apparatus according to a third embodiment of the present invention.

Next, the shape measuring apparatus according to the third embodiment of the present invention will be described. FIG. 4 is a schematic view illustrating the configuration of a shape measuring apparatus 40 according to this embodiment. In FIG. 4, those constituent elements that are the same as the shape measuring apparatus 1 according to the first embodiment shown in FIG. 1 are denoted by the same reference numerals, and description will not be repeated. The characteristic feature of the shape measuring apparatus 40 according to the present embodiment resides in the point that partitions 41 corresponding to the partitions 9 of the first embodiment include three partition walls (first partition wall 41a to third partition wall 41c), and the temperature adjusted air also flows into the gaps G1 and G2 between each partition wall. Firstly, the shape measuring apparatus 40 includes a third adjusting mechanism 42 for air supply/discharge in the partition 41. The third adjusting mechanism 42 includes a first supply portion 43 configured to supply temperature adjusted air A3 in the gap (first gap) G1 between the first partition wall 41a and the second partition wall 41b, and a first discharge portion 44 disposed at a position facing the first supply portion 43 and configured to recover and discharge temperature adjusted air A3. Furthermore, the third temperature adjusting mechanism 42 includes a second supply portion 45 configured to supply temperature adjusted air A4 to the gap (second gap) G2 between the second partition wall 41b and the third partition wall 41c, and a second discharge portion 46 disposed at a position facing the second supply portion 45 and configured to recover and discharge temperature adjusted air A4. The portion of the third adjusting mechanism 42 in which the temperature adjusted air A3 flows is configured as a fourth adjusting mechanism, and the portion in which the temperature adjusted air A4 flows is configured as a fifth adjusting mechanism.

In this case, firstly, the duct 6 supplies temperature adjusted air A2 in which the target temperature is adjusted to a second temperature (23 degrees C.) to the second space S2. In this regard, the control unit 7 sets the fourth adjusting mechanism so that the target temperature of the temperature adjusted air A3 that flows in the gap G1 in proximity to the second space S2 is equal to the first temperature (2 degrees C.), and so that the direction of supply is opposed to (opposite to) the temperature adjusted air A2. The control unit 7 also sets the fifth adjusting mechanism so that the target temperature of the temperature adjusted air A4 that flows in the gap G2 in proximity to the first space S1 is equal to the first temperature, and so that the direction of supply is opposed to the temperature adjusted air A3. Although the first adjusting mechanism 8 supplies the temperature adjusted air A1 in relation to which the target temperature is adjusted to the first temperature to the first space S1 in the same manner as the first embodiment, the direction of supply of the temperature adjusted air A1 is set to be opposite to the temperature adjusted air A4 in the present embodiment. In other words, in FIG. 4, the supply portion 10 of the first adjusting mechanism 8 is present on the minus side in the X axis direction, and the discharge portion 11 corresponding to the supply portion 10 is present in the plus side in the X axis direction.

Also in the present embodiment, it is important to suppress the temperature increase in the object 2 due to the transmission of heat to the first space S1 resulting from the temperature difference between the first space S1 and the second space S2. Consequently, in the present embodiment, the control unit 7 sets the third adjusting mechanism 42 to absorb the heat flowing from the second space S2 into the first space S1 with the temperature adjusted air A3 and the temperature adjusted air A4, and use the air flow to send the air to the first discharge portion 44 and the second discharge portion 46. Therefore, the agitating operation of heat in the direction that is perpendicular to the flow is weakened in comparison to a configuration having a single gap since the temperature adjusted air is separated into two stages by the partition 41. As a result, the temperature increase of the temperature adjusted air A4 is suppressed since it is possible to further reduce the heat amount that is transmitted to the first space S1, and therefore the temperature increase of the object 2 can be effectively reduced.

Furthermore, in the present embodiment, since the three positions of the temperature adjusted air A1, A3, A4 flow in respectively opposed directions in the partition 41, the temperature distribution that is produced in particular in the surface of the object 2 can be effectively reduced. As an example, when a configuration is considered in which the three positions of the temperature adjusted air A1, A3, A4 all flow in the same direction, the temperature of the three positions of the temperature adjusted air A1, A3, A4 increases in a monotone configuration from the upstream to the downstream direction. Therefore, a temperature distribution is produced in the surface of the object 2 in which the temperature increases from the upstream to the downstream direction. In this regard, when particular reference is made to the temperature adjusted air A1 in the present embodiment, the temperature of the temperature adjusted air A1 is such that the heat from the temperature adjusted air A4 is absorbed on the upstream side and causes an increase in temperature, and exceeds the temperature of the temperature adjusted air A4 at a midstream position to thereby invert the dimensional relationship of the temperature. As a result, since heat is gradually radiated from the temperature adjusted air A1 to the temperature adjusted air A4, the temperature of the temperature adjusted air A1 gradually decreases. Therefore, in this configuration, the temperature variation in the temperature adjusted air A1 exhibits an upwardly oriented projection along the flow passage, and is smaller than a configuration in which the maximum temperature increases in a monotone manner. Therefore, according to the present embodiment, the same effect as the first embodiment is obtained, and in particular, the temperature distribution in the surface of the object 2 is effectively reduced.

In the present embodiment, although three partition walls configure the partition 41, and the two gaps are provided for the flow of temperature adjusted air, the present invention is not limited in this regard, and the number of partition walls may be reduced to two, or increased to four. For example, when the number of partition walls is increased, since the number of gaps for the flow of temperature adjusted air can be increased as a result, the agitating operation of the heat in the partition walls resulting from the moving flow can be effectively suppressed, and the insulating performance between the first space S1 and the second space S2 can be enhanced. Furthermore, when the a plurality of supply directions for temperature adjusted air that flows in the plurality of gaps is set to be respectively opposed as described above, a further reduction in the temperature distribution in the surface of the object 2 is effectively enabled.

(Fourth Embodiment)

Figure 5A:
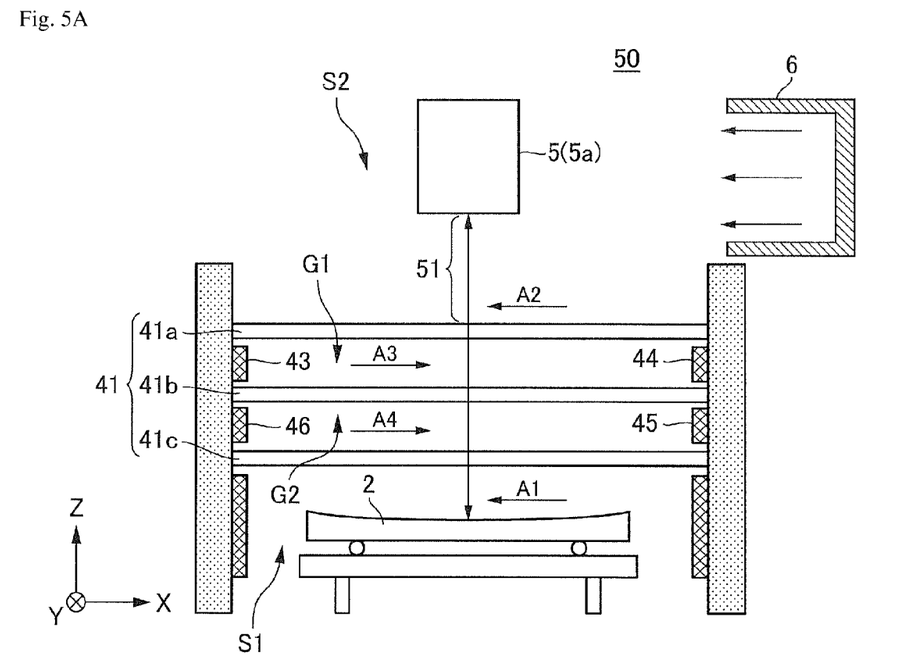
FIG. 5A illustrates a configuration of a shape measuring apparatus according to a fourth embodiment of the present invention.
Figure 5B:
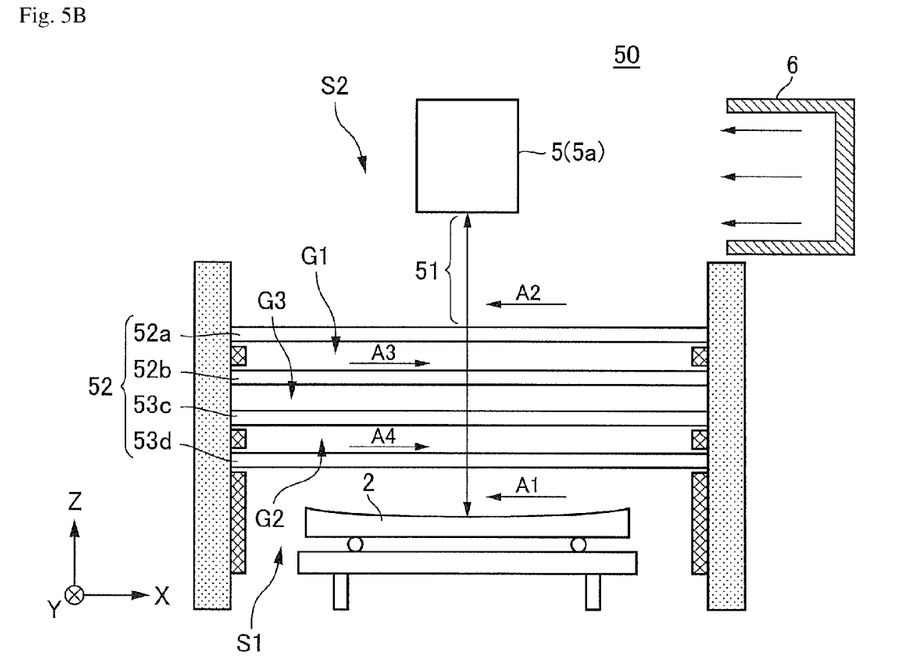
FIG. 5B illustrates a configuration of a shape measuring apparatus according to a fourth embodiment of the present invention.

Next, the shape measuring apparatus according to the fourth embodiment of the present invention will be described. FIGS. 5A and 5B are schematic views illustrating the configuration of a shape measuring apparatus 50 according to this embodiment. In FIGS. 5A and 5B, those basic constituent elements that are the same as the shape measuring apparatus 40 according to the third embodiment shown in FIG. 4 are denoted by the same reference numerals, and description will not be repeated. The characteristic feature of the shape measuring apparatus 50 according to the present embodiment resides in the point that the probe 5a shown in FIG. 2A is adopted as the measuring device 5, and thereby the effect of the temperature variation in the probe 5a is suppressed. The shape measuring apparatus 50 includes the following settings that differ from the shape measuring apparatus 40 according to the third embodiment as shown in FIG. 5A. Firstly, although the target temperature of the temperature adjusted air A1 is set to the first temperature (2 degrees C.) in the same manner as the third embodiment, the supply direction is opposite. Next, although the supply direction of the temperature adjusted air A3 is the same as the third embodiment, the target temperature is set to the second temperature (23 degrees C.) rather than the first temperature. Then, although the target temperature of the temperature adjusted air A4 is set to the first temperature in the same manner as the third embodiment, the supply direction is opposite. The temperature adjusted air A2 is the same as the third embodiment in relation to the temperature and the supply direction.

The present embodiment also places emphasis on the suppression of the temperature increase in the object 2 due to transmission of heat to the first space S1 due to the temperature difference between the first space S1 and the second space S2. In this regard, the temperature difference between the first space S1 and the second space S2 obtains a temperature distribution also in relation to the temperature adjusted air A2 in the space S2. In particular, when the measuring device 5 is the probe 5a, it is important to reduce the fluctuation of the temperature in the optical path 51 due to the possibility that the measurement accuracy will be reduced by the occurrence of a temperature distribution in the optical path 51 of the laser light that represents the measurement light. Therefore, in the present embodiment, the control unit 7 sets the fifth adjusting mechanism so that the target temperature of the temperature adjusted air A4 that becomes adjacent to the first space S1 through the third partition wall 41c coincides with the first temperature in the same manner as the first space S1. On the other hand, the control unit 7 sets the fourth adjusting mechanism so that the target temperature of the temperature adjusted air A3 that becomes adjacent to the second space S2 through the first partition wall 41a coincides with the first temperature in the same manner as the second space S2. This setting mainly enables transfer of heat due to the temperature difference between the temperature adjusted air A3 and the temperature adjusted air A4 through the second partition wall 41b. At this time, the temperature of the temperature adjusted air A3 gradually decreases along the flow path, and the temperature of the temperature adjusted air A4 gradually increases. Here, the temperature reduction amount deltaT of the temperature adjusted air temperature adjusted air A3 can be reduced by increasing the flow amount of the temperature adjusted air A3, and therefore the control unit 7 may set the flow amount of the third adjusting mechanism 42 so that the temperature reduction amount for example is sufficiently reduced to approximately deltaT=0.1 degrees C. Although the temperature of the temperature adjusted air A2 is reduced by the radiation of heat to the temperature adjusted air A3 in the gap G1 through the first partition wall 41a, since the temperature reduction amount between the temperature adjusted air A3 and the temperature adjusted air A4 is reduced as described above, the reduction in the temperature of the temperature adjusted air A2 can be reduced to the greatest possible degree. Therefore, since the temperature distribution in particular resulting in the optical path 51 of the second space S2 can be reduced, the occurrence of the fluctuation in the temperature can be effectively suppressed. When the flow amount of the temperature adjusted air A4 is adjusted in the same manner, since the temperature increase in the temperature adjusted air A1 can be reduced, the temperature increase in the object 2 can also be effectively reduced. Furthermore, in the present embodiment, since the supply direction of the temperature adjusted air A2 and the temperature adjusted air A3 flowing in the second space is opposed, as described in the third embodiment, the temperature fluctuation in the direction along the flow of the temperature adjusted air A2 can be reduced. In this manner, the temperature distribution in the second space S2 can be effectively reduced. In the same manner, in the present embodiment, since the supply direction of the temperature adjusted air A4 and the temperature adjusted air A1 flowing in the first space can be opposed, the temperature distribution in the surface of the object 2 can be reduced. In this manner, according to the present embodiment, the same effect as the third embodiment can be obtained, and in particular, it is possible to suppress the effect of the temperature change relative to the probe 5a that is provided in the second space S2.

In the above description, the target temperature of the temperature adjusted air A3 is the same as the second temperature of the temperature adjusted air A2, and the target temperature of the temperature adjusted air A4 is the same as the first temperature of the temperature adjusted air A1. In this regard, the temperature of the temperature adjusted air A3 is set to be higher than the second temperature, and the temperature of the temperature adjusted air A4 is set to be lower than the first temperature. More specifically, when the temperature adjusted air A2 is set to 23 degrees C., the control unit 7 causes the fourth adjusting mechanism to adjust the temperature of the temperature adjusted air A3 to 24 to 27 degrees C. On the other hand, when the temperature adjusted air A1 is set to 2 degrees C., the control unit 7 causes the fifth adjusting mechanism to adjust the temperature of the temperature adjusted air A4 to 1 to −2 degrees C.

Figure 6A:
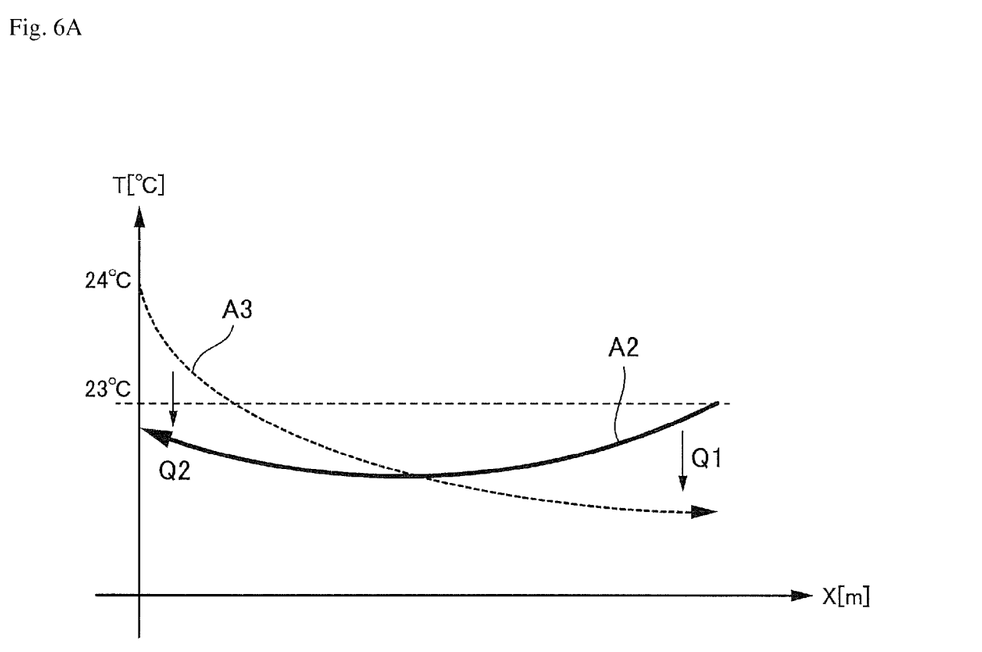
FIG. 6A illustrates a graph of the temperature change in the adjusted air according to the fourth embodiment of the present invention.
Figure 6B:
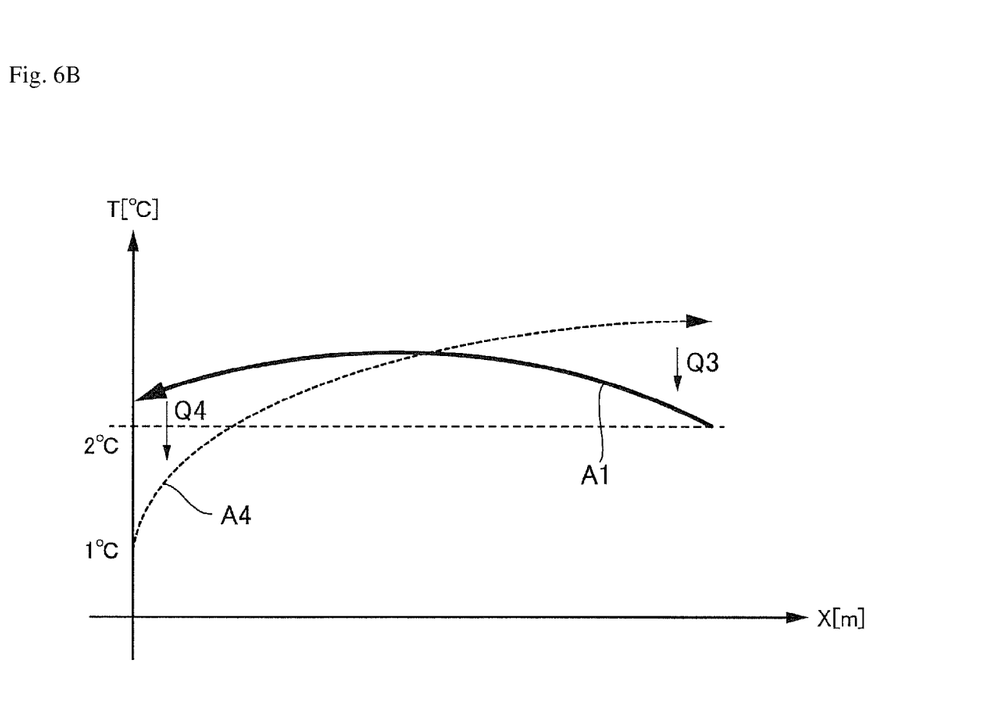
FIG. 6B illustrates a graph of the temperature change in the adjusted air according to the fourth embodiment of the present invention.

FIGS. 6A and 6B illustrate a graph of the temperature change in the direction (X axial direction) along the flow of the temperature adjusted air. In particular, FIG. 6A is a graph illustrating a comparison of the temperature change between the temperature adjusted air A2 and the temperature adjusted air A3. Firstly, since the temperature adjusted air A3 gradually radiates heat towards the temperature adjusted air A4 along the flow, the temperature of the temperature adjusted air A3 decreases in a monotone manner. On the other hand, the temperature adjusted air A2 radiates a heat amount Q1 towards the temperature adjusted air A3 on the upstream side (region in which the X value is larger) in the graph, and the temperature gradually decreases. However, when the temperature of the temperature adjusted air A3 undergoes an inversion at a midway point, the heat amount Q2 is absorbed from the temperature adjusted air A3, and the temperature gradually increases. That is to say, the temperature settings described above enable the reheating of the temperature adjusted air A2 by the temperature adjusted air A3, in addition to the effective reduction of the temperature distribution of the temperature adjusted air A2, and thereby enables the temperature of the temperature adjusted air A2 to be adjusted with high accuracy to 23 degrees C. which is the target temperature. On the other hand, FIG. 6B is a graph illustrating a comparison of the temperature change between the temperature adjusted air A1 and the temperature adjusted air A4. In this case, the temperature adjusted air A4 is re-cooled, the temperature distribution of the temperature adjusted air A1 is reduced, and the temperature of the temperature adjusted air A1 can be adjusted with high accuracy to 2 degrees C. which is the target temperature. The set temperature above of the temperature adjusted air A3 and the temperature adjusted air A4 is merely exemplary, and it is sufficient as long as the temperature of the temperature adjusted air A3 is at least greater than or equal to the temperature of the temperature adjusted air A2, or the temperature of the temperature adjusted air A4 may be at least less than or equal to temperature adjusted air A1.

Furthermore, in the present embodiment, the number of partition walls that configures the partition 41 is not limited to three, and as shown in FIG. 5B, the number of partition walls may be modified to four. When the partition 52 that corresponds to the partition 41 in FIG. 5A includes the four partition walls from the first partition wall 52a to the forth partition wall 52d, the gap G3 between the second partition wall 52b and the third partition wall 52c, that are positioned between the partition walls on both ends, may be configured for example as an air layer. In this configuration, since the thermal resistivity between the temperature adjusted air A3 of the second temperature and the temperature adjusted air A4 of the first temperature is increased, in comparison to the setting shown in FIG. 5A, the flow amount of the temperature adjusted air A3 and the temperature adjusted air A4 is reduced. The inner portion of the gap G3 is not configured as an air layer, but rather the thermal resistivity may be further increased by reducing the pressure to configure a vacuum state.

In the respective embodiments above, although the object has been described as an optical element used in a temperature environment that is lower than ambient temperature, the use environment may be a temperature environment that is higher than ambient temperature. Furthermore, the object that is the subject of measurement is not limited to an optical element, but may also include another object that is used in a temperature environment that differs from ambient temperature. Furthermore, the object that is subject to measurement, for example, may be a die for preparation (molding) of the optical element or the like. In addition, as described in the embodiments above, an example of measuring the shape of the surface of the object has been described based on the information for the interference band of the reference light and the measurement light or the information for the change in the light path length of the measurement light. However, the characteristic of the object that is measured is not limited to the surface shape. It is sufficient if the characteristics relate to an object corresponding to information obtained from measurement light that has an interaction with the object in a configuration such as the above information. For example, it may relate to the surface roughness of the object, or an aberration of a wave front formed by the optical system as an object.

(Fifth Embodiment)

Figure 7:
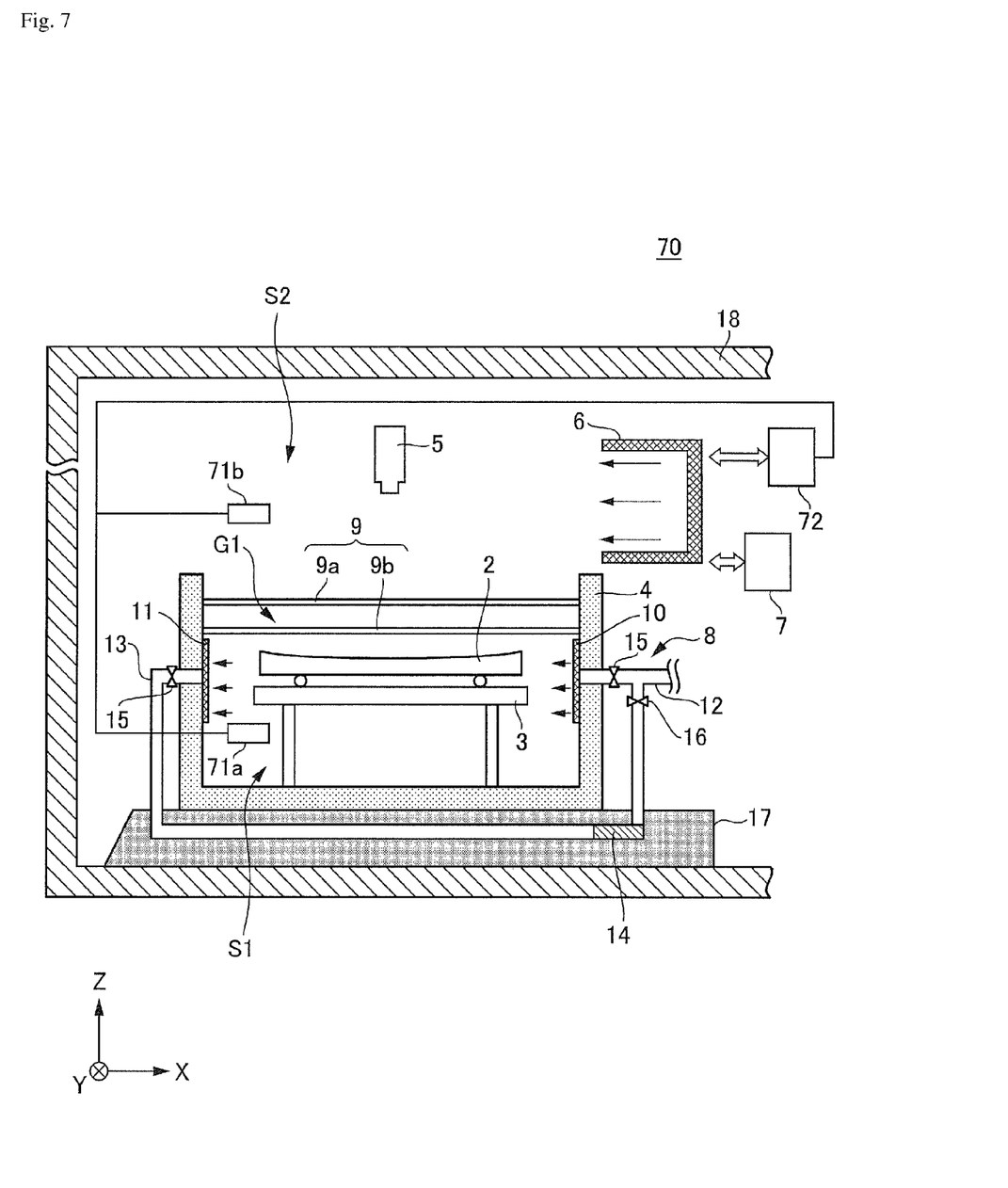
FIG. 7 illustrates a configuration of a shape measuring apparatus according to a fifth embodiment of the present invention.

Next, the shape measuring apparatus according to the fifth embodiment of the present invention will be described. FIG. 7 is a schematic view illustrating the configuration of a shape measuring apparatus 70 according to this embodiment. In particular, in FIG. 7, those constituent elements that are the same as the shape measuring apparatus according to the first embodiment shown in FIG. 1 are denoted by the same reference numerals, and description will not be repeated. The characteristic feature of the shape measuring apparatus 70 according to the present embodiment resides in the point that the humidity in the second space S2 is controlled (adjusted) using a humidity control device (humidity regulator) 72. The temperature of the gas supplied to the second space S2 is controlled using a temperature control device (not shown) through the duct 6, and the temperature of the gas supplied to the first space S1 is controlled using the first adjusting mechanism 8. Therefore, for example, even when the temperature of the second space S2 is set to 23 degrees C., and the temperature of the first space S1 is set to 2 degrees C., it is possible to reduce or prevent dew condensation resulting from the temperature difference between the first space S1 and the second space S2 by controlling the humidity of the gas supplied from the duct 6 to the second space S2 by use of the humidity control device 72. The control of the humidity may be calculated from the generally known relationship between the temperature and the saturated aqueous vapor amount, and is described in detail below.

The humidity control device 72 according to the present embodiment may include a temperature sensor (first temperature measuring device) 71a configured to measure the temperature of the first space S1 that accommodates the object 2 and a temperature sensor (second temperature measuring device) 71b configured to measure the temperature of the second space S2 that accommodates the measuring device 5. In this configuration, the temperature is determined by the temperature sensors 71a and 71b, and the humidity of the gas supplied from the duct 6 by use of the humidity control device 72 is controlled based on the determined temperature. The method for controlling the humidity determines the humidity of the gas supplied from the duct 6 based on the temperature determined by the temperature sensor 71a and 71b, and the information related to a saturated aqueous vapor amount (maximum mass of aqueous vapor that can exist in 1 m$^3$ space). The purpose of controlling the humidity is to prevent dew condensation at the boundary surface, for example, the partition 9. When a temperature difference occurs between the first space S1 and the second space S2, there is a risk of occurrence of dew condensation on the partition 9, and high-accuracy determining operations are impeded by dew condensation. In this regard, for example, when the temperature of the first space S1 is set to 2 degrees C. and the temperature of the second space is set to 23 degrees C., a gas at 23 degrees C. that forms the aqueous vapor amount at less than or equal to the 2 degree C. saturated aqueous vapor amount may be supplied from the duct 6 in response to humidity control. The saturated aqueous vapor amount may be calculated using Tetens Formula (Equation 1 and Equation 2). The saturated aqueous vapor amount a can be calculated from the saturated aqueous vapor pressure E (t) at a given temperature t degrees C.

$$E(t) = 6.11 \times 10^{\frac{7.5t}{t+237.3}} \quad \text{Equation 1}$$

$$a = \frac{217 \times E(t)}{t + 273.15} \quad \text{Equation 2}$$

These equations show that the saturated aqueous vapor amount at 2 degrees C. is 5.57 (g/m3), and the saturated aqueous vapor amount at 23 degrees C. is 20.59 (g/m3). Therefore, the humidity of the gas that is supplied from the duct 6 is controlled by the humidity control device 72 to be less than or equal to 5.57/20.59×100 nearly equal 27.1%, and therefore there is no risk of dew condensation on the temperature boundary surface. The humidity of the gas supplied from the duct 6 is adjusted by a drying device (the drying device is included in the duct 6) for the gas prior to supply from the duct 6. Furthermore, in the present embodiment, although the humidity of the gas supplied to the second space S2 is controlled, in a configuration in which the temperature of the first space S1 is higher than the temperature of the second space S2, the humidity of the gas supplied to the first space S1 may be controlled by a humidity control device (not shown). That is to say, it is sufficient to control at least the humidity of the gas that is supplied to that space, of either the first space S1 or the second space S2, that is maintained to a higher temperature. Furthermore, in the present embodiment, although the humidity control device 72 is configured to include both a temperature sensor 71a and 71b, when the temperature of at least one of the first space S1 and the second space S2 is known, either one of the temperature sensors, 71a, 71b may be omitted.

As described above, according to the present embodiment, a measuring apparatus can be provided that is useful for preventing or reducing dew condensation in a determining environment (measurement condition) in which there is a temperature difference between the first space S1 and the second space S1.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-054713 filed on Mar. 12, 2012, and Japanese Patent Application No. 2013-027967 filed on Feb. 15, 2013, which are hereby incorporated by reference herein in their entirety.

The invention claimed is:

1. A measuring apparatus that includes a light projecting and receiving device configured to project and receive light, and measures an object based on the projected and received light, the measuring apparatus comprising:
    a chamber configured to enclose a first space for accommodating the object;
    a partition configured to separate the first space from a second space that accommodates the light projecting and receiving device, and configured to transmit light;
    a first regulator configured to regulate a temperature of the first space to a first temperature by flowing gas through the first space; and
    a second regulator configured to regulate a temperature of the second space to a second temperature different from the first temperature by flowing gas through the second space,
    wherein the partition includes a plurality of partition walls disposed with a gap therebetween to reduce heat transfer between the first space and the second space.

2. The apparatus according to claim 1, wherein the first regulator includes a supply port configured to supply gas and an exhaust port configured to exhaust the supplied gas in the first space, the supply port and the exhaust port opposing to each other via the object, so that the supplied gas flows along the partition.

3. The apparatus according to claim 2, wherein the first regulator includes a first pair of the supply port and the exhaust port, and a second pair of the supply port and the exhaust port that is disposed further from the partition than the first pair, so that a gas flow by the first pair and a gas flow by the second pair are opposed to each other.

4. The apparatus according to claim 1, wherein the partition includes three partition walls disposed with a first gap and a second gap therebetween.

5. The apparatus according to claim 4, further comprising a third regulator configured to regulate a temperature of the first gap by flowing gas through the first gap, and a fourth regulator configured to regulate a temperature of the second gap by flowing gas through the second gap.

6. The apparatus according to claim 5, wherein:
the first space is adjacent to the first gap via one of the three partition walls,
the second space is adjacent to the second gap via another of the three partition walls, and
the first regulator, the second regulator, the third regulator, and the fourth regulator are configured so that a gas flow in the first space is opposed to a gas flow in the first gap, and so that a gas flow in the second space is opposed to a gas flow in the second gap.

7. The apparatus according to claim 6, wherein the first regulator and the third regulator are configured so that a target temperature of the gas supplied to the first space is different from a target temperature of the gas supplied to the first gap.

8. The apparatus according to claim 7, wherein the second regulator and the fourth regulator are configured so that a target temperature of the gas supplied to the second space is different from a target temperature of the gas supplied to the second gap.

9. The apparatus according to claim 4, wherein a partition wall between two partition walls disposed at both ends of the three partition walls includes a plurality of partition walls disposed with a gap therebetween.

10. The apparatus according to claim 1, further comprising a third regulator configured to regulate a temperature of the gap by flowing gas through the gap.

11. The apparatus according to of claim 1, further comprising a humidity regulator configured to regulate a humidity of the first space or the second space or both thereof.

12. The apparatus according to claim 11, wherein the humidity regulator includes a first temperature measuring device configured to measure a temperature of the first space or a second temperature measuring device configured to measure a temperature of the second space or both thereof, and is configured to perform regulation of a humidity of the second space based on an output of the first temperature measuring device or regulation of a humidity of the first space based on an output of the second temperature measuring device or both thereof.

13. A measuring apparatus that includes a light projecting and receiving device configured to project and receive light, and measures an object based on the projected and received light, the measuring apparatus comprising:
a chamber configured to enclose a first space for accommodating the object;
a partition configured to separate the first space from a second space that accommodates the light projecting and receiving device, and configured to transmit light, the partition including a plurality of partition walls disposed with a gap therebetween;
a first regulator configured to regulate a temperature of the first space to a first temperature by flowing gas through the first space;
a second regulator configured to regulate a temperature of the second space to a second temperature different from the first temperature by flowing gas through the second space; and
a third regulator configured to regulate a temperature of the gap by flowing gas through the gap.

14. A measuring apparatus that includes a light projecting and receiving device configured to project and receive light, and measures an object based on the projected and received light, the measuring apparatus comprising:
a chamber configured to enclose a first space for accommodating the object;
a partition configured to separate the first space from a second space that accommodates the light projecting and receiving device, and configured to transmit light, the partition including three partition walls disposed with a first gap and a second gap therebetween;
a first regulator configured to regulate a temperature of the first space to a first temperature by flowing gas through the first space;
a second regulator configured to regulate a temperature of the second space to a second temperature different from the first temperature by flowing gas through the second space;
a third regulator configured to regulate a temperature of the first gap by flowing gas through the first gap; and
a fourth regulator configured to regulate a temperature of the second gap by flowing gas through the second gap.

15. The apparatus according to claim 14, wherein:
the first space is adjacent to the first gap via one of the three partition walls,
the second space is adjacent to the second gap via another of the three partition walls, and
the first regulator, the second regulator, the third regulator, and the fourth regulator are configured so that a gas flow in the first space is opposed to a gas flow in the first gap, and a gas flow in the second space is opposed to a gas flow in the second gap.

16. The apparatus according to claim 15, wherein the first regulator and the third regulator are configured so that a target temperature of the gas supplied to the first space is different from a target temperature of the gas supplied to the first gap.

17. The apparatus according to claim 16, wherein the second regulator and the fourth regulator are configured so that a target temperature of the gas supplied to the second space is different from a target temperature of the gas supplied to the second gap.

18. A measuring apparatus that includes a light projecting and receiving device configured to project and receive light, and measures an object based on the projected and received light, the measuring apparatus comprising:
a chamber configured to enclose a first space for accommodating the object;
a partition configured to separate the first space from a second space that accommodates the light projecting and receiving device, and configured to transmit light, the partition including a plurality of partition walls disposed with a gap therebetween;
a first regulator configured to regulate a temperature of the first space to a first temperature by flowing gas through the first space;
a second regulator configured to regulate a temperature of the second space to a second temperature different from the first temperature by flowing gas through the second space; and
a humidity regulator configured to regulate a humidity of the first space or the second space or both thereof.

19. The apparatus according to claim 18, wherein the humidity regulator includes a first temperature measuring device configured to measure a temperature of the first space or a second temperature measuring device configured to measure a temperature of the second space or both thereof, and is configured to perform regulation of a humidity of the second space based on an output of the first temperature measuring device or regulation of a humidity of the first space based on an output of the second temperature measuring device or both thereof.

* * * * *